United States Patent
Hunukumbure et al.

(10) Patent No.: US 11,570,775 B2
(45) Date of Patent: Jan. 31, 2023

(54) METHOD AND APPARATUS FOR IMPROVING IN AND RELATING TO INTEGRATED ACCESS AND BACKHAUL AND NON TERRESTRIAL NETWORKS

(71) Applicant: SAMSUNG ELECTRONICS CO., LTD., Suwon-si (KR)

(72) Inventors: Mythri Hunukumbure, Staines Middlesex (GB); Yinan Qi, Staines Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 16/768,386

(22) PCT Filed: Nov. 29, 2018

(86) PCT No.: PCT/KR2018/014937
§ 371 (c)(1),
(2) Date: May 29, 2020

(87) PCT Pub. No.: WO2019/107961
PCT Pub. Date: Jun. 6, 2019

(65) Prior Publication Data
US 2020/0322953 A1    Oct. 8, 2020

(30) Foreign Application Priority Data

Dec. 1, 2017    (GB) .................................... 1720080

(51) Int. Cl.
*H04W 72/04*    (2009.01)
*H04L 5/00*    (2006.01)

(52) U.S. Cl.
CPC ....... *H04W 72/0453* (2013.01); *H04L 5/0048* (2013.01)

(58) Field of Classification Search
CPC .......... H04W 72/0453; H04W 72/0426; H04L 5/0048; H04L 5/0007; H04L 5/005; H04L 5/0073; H04L 5/0035; H04L 5/0078
See application file for complete search history.

(56) References Cited

U.S. PATENT DOCUMENTS 9,179,320 B2    11/2015  Shin et al.
11,206,118 B2 *  12/2021  Hunukumbure .... H04W 72/042
(Continued)

FOREIGN PATENT DOCUMENTS

EP    1750403    2/2007
GB    201707257    6/2017
(Continued)

OTHER PUBLICATIONS

Panasonic, 3GPP TSG RAN WG1 Meeting #91 R1-1720370 "PT-RS design", Nov. 17, 2017 (Year: 2017).*
(Continued)

*Primary Examiner* — Justin T Van Roie
(74) *Attorney, Agent, or Firm* — Nixon & Vanderhye P.C.

(57) ABSTRACT

A first relay node in a wireless communication system receives, from a second relay node via a backhaul link, coordination information including an index indicating a density pattern of a second phase tracking reference signal (PTRS). The first relay node transmits, to a terminal, configuration information including information on a first subcarrier offset for a first PTRS. The first relay node transmits to the terminal the first PTRS based on the coordination information and the information on the first subcarrier offset. The first subcarrier offset for the first PTRS is different from a second subcarrier offset for the second PTRS.

20 Claims, 4 Drawing Sheets

(56) References Cited

U.S. PATENT DOCUMENTS

| | | | |
|---|---|---|---|
| 2014/0314000 | A1 | 10/2014 | Liu et al. |
| 2017/0208574 | A1 | 7/2017 | Ramakrishna et al. |
| 2019/0081844 | A1 | 3/2019 | Lee et al. |
| 2019/0181922 | A1* | 6/2019 | Lee ............ H04B 7/0626 |
| 2020/0052930 | A1 | 2/2020 | Kim et al. |
| 2021/0058207 | A1* | 2/2021 | Lee ............ H04L 5/0051 |

FOREIGN PATENT DOCUMENTS

| | | |
|---|---|---|
| GB | 2562117 | 11/2017 |
| JP | H0541711 | 2/1993 |
| WO | 2011/044558 | 4/2011 |
| WO | 2014/051322 | 4/2014 |
| WO | 2017/188591 | 11/2017 |
| WO | 2018/044715 | 3/2018 |
| WO | 2018/063892 | 4/2018 |
| WO | 2018/027222 | 8/2018 |
| WO | 2018/143537 | 8/2018 |

OTHER PUBLICATIONS

Intel Corporation, 3GPP TSG-RAN WG1 #89 R1-1707366 "On PT-RS for CP-OFDM", May 7, 2017 (Year: 2017).*

ZTE, 3GPP TSG RAN WG1 Meeting #89 R1-1707132 "Discussion on RS for phase tracking", May 7, 2017 (Year: 2017).*

"3GPP TR 22.862", $3^{rd}$ Generation Partnership Project; Technical Specification Group Services and System Aspects; Feasibility Study on New Services and Markets Technology Enablers for Critical Communications; V14.1.0, Sep. 2016, 31 pages.

"3GPP TR 22.863", $3^{rd}$ Generation Partnership Project; Technical Specification Group Services and System Aspects; Feasibility Study on New Services and Markets Technology Enablers—Enhanced Mobile Broadband; V14.1.0, Sep. 2016, 21 pages.

"3GPP TR 22.864", $3^{rd}$ Generation Partnership Project; Technical Specification Group Services and System Aspects; Feasibility Study on New Services and Markets Technology Enablers—Network Operation; V15.0.0, Sep. 2016, 35 pages.

"3GPP TR 22.891", $3^{rd}$ Generation Partnership Project; Technical Specification Group Services and System Aspects; Feasibility Study on New Services and Markets Technology Enablers; V14.2.0, Sep. 2016, 95 pages.

"3GPP TR 38.913", $3^{rd}$ Generation Partnership Project; Technical Specification Group Radio Access Network; Study on Scenarios and Requirements for Next Generation Access Technologies; V15.0.0, Jun. 2018, 39 pages.

"Study on NR to support Non-Terrestrial Networks", 3GPP TSG RAN Meeting #75, RP-170717, Dubrovnik, Croatia, Mar. 6-9, 2017, 5 pages.

"NR-NTN: TP for Chap 7.3 NR modifications to support NTN", 3GPP TSG RAN Meeting #80, RP-180658, La Jolla, USA, Jun. 11-14, 2018, 37 pages.

"On PT-RS design", 3GPP TSG RAN WG1 Meeting 91, R1-1719913, Reno, USA, Nov. 27-Dec. 1, 2017, 5 pages.

"PTRS design for 40GHz and higher frequency bands", 3GPP TSG RAN WG1 Meeting 91, R1-1720317, Reno, USA, Nov. 27-Dec. 1, 2017, 6 pages.

"Remaining details on PTRS design", 3GPP TSG RAN WG1 Meeting 91, R1-1720741, Reno, USA, Nov. 27-Dec. 1, 2017, 15 pages.

"PTRS design consideration for NTN", 3GPP TSG RAN WG1 Meeting #92, R1-1802004, Athens, Greece, Feb. 26-Mar. 2, 2018, 3 pages.

"PT-RS design consideration for NTN", 3GPP TSG RAN WG1 Meeting #92b, R1-1804394, Sanya, China, Apr. 16-20, 2018, 3 pages.

"PT-RS consideration for NTN", 3GPP TSG RAN WG1 Meeting #93, R1-1806749, Busan, Korea, May 21-25, 2018, 4 pages.

"New SID Proposal: Study on Integrated Access and Backhaul for NR", 8881123GPP TSG RAN Meeting #75, RP-170821, Dubrovnik, Croatia, Mar. 6-9, 2017, 5 pages.

International Search Report for PCT/KR2018/014937 dated Mar. 11, 2019, 3 pages.

Written Opinion of the ISA for PCT/KR2018/014937 dated Mar. 11, 2019, 4 pages.

Extended Search Report dated Dec. 18, 2020 for counterpart EP Application No. 18884102.7.

Samsung, "On DL PT-RS Design", 3GPP TSG RAN WG1 NR Ad-hoc#2, R1-1710686, Jun. 16, 2017 (5 pages).

Search Report dated Nov. 9, 2018 in Application No. GB1720080.9.

Panasonic, 3GPP TSG RAN WG1 Meeting #90, "PT-RS design" R1-1713021, Prague, Czechia, Aug. 21-25, 2017, 10 pages.

Office Action for IN Application No. 202017022386 dated Apr. 20, 2022, 5 pages.

First Office Action for CN Application No. 201880077833.4 dated Nov. 18, 2022 and English translation, 12 pages.

* cited by examiner

[Fig. 1]
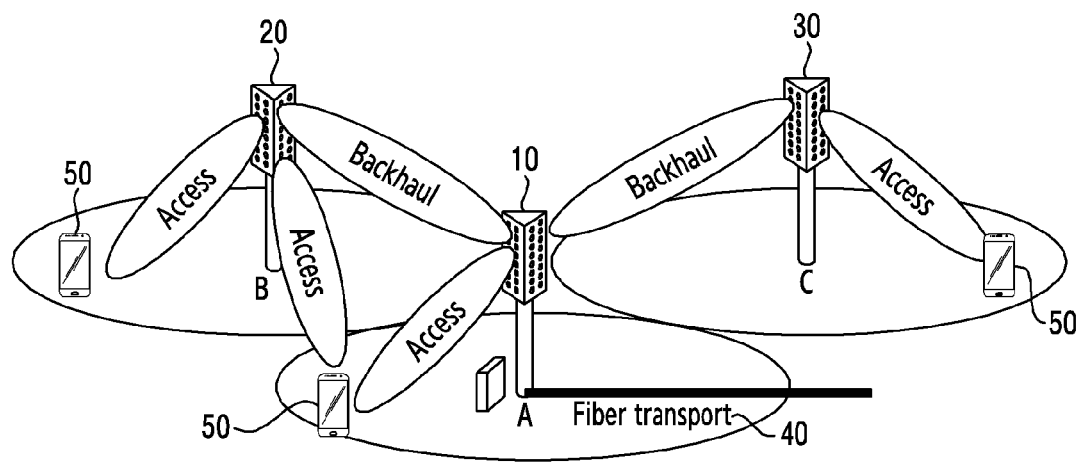
[Fig. 2]
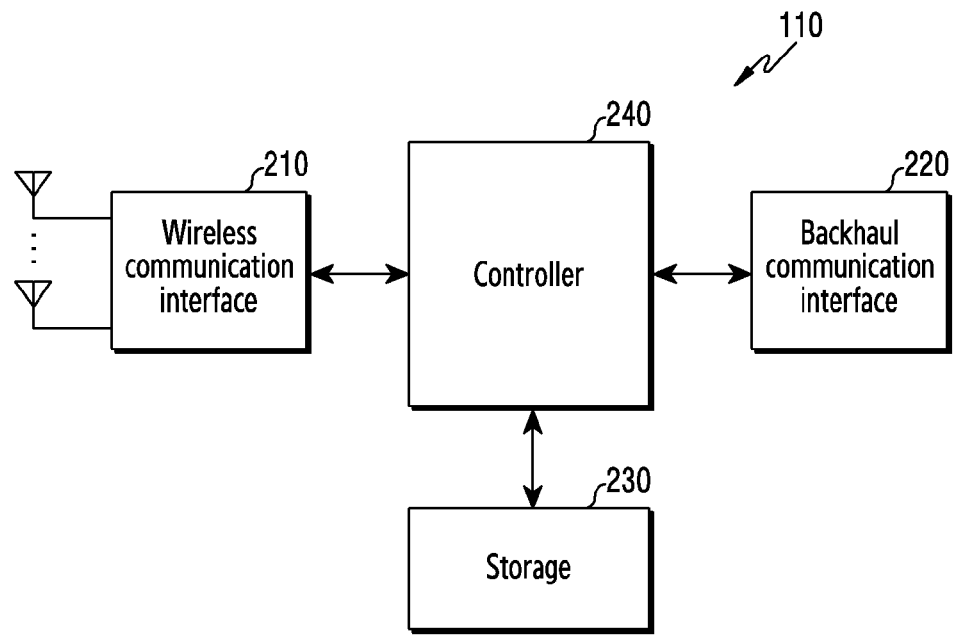

[Fig. 3]
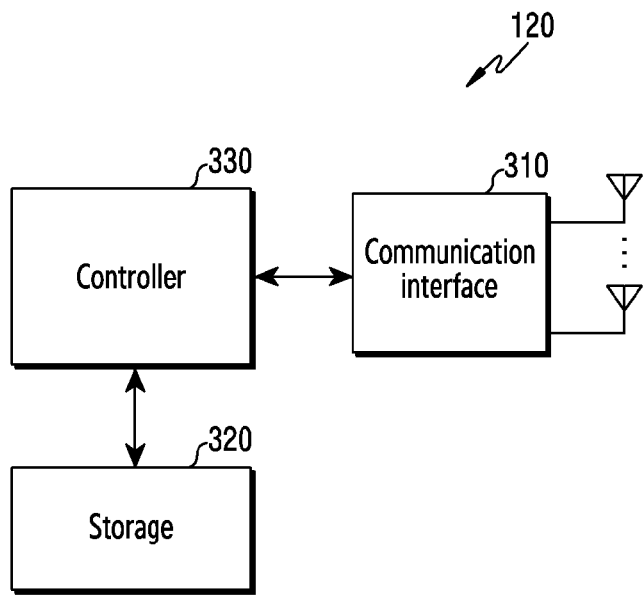
[Fig. 4]
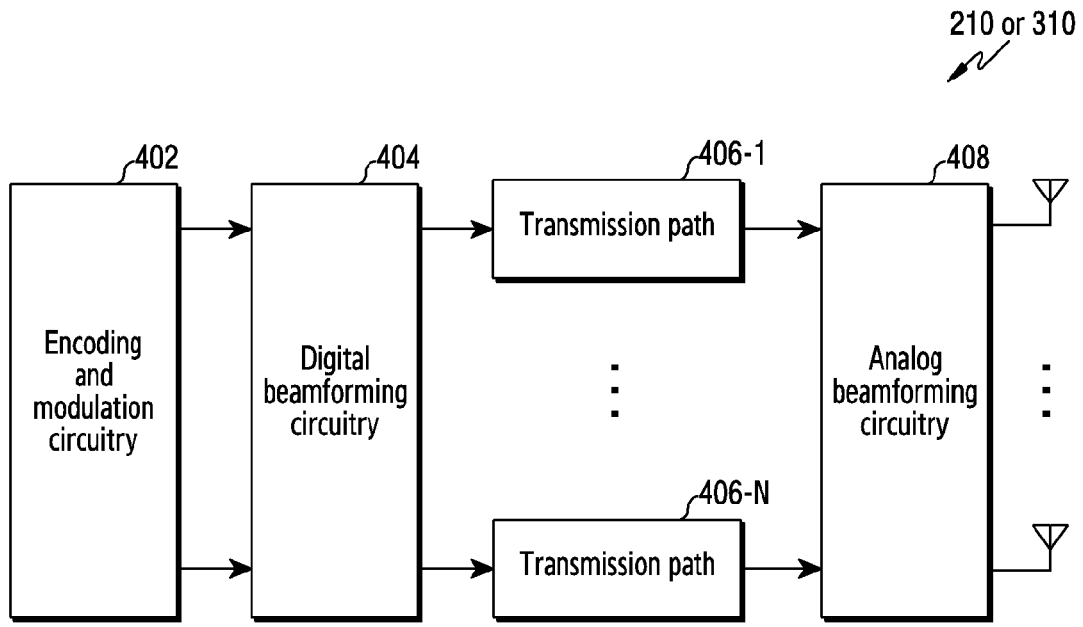

[Fig. 5]
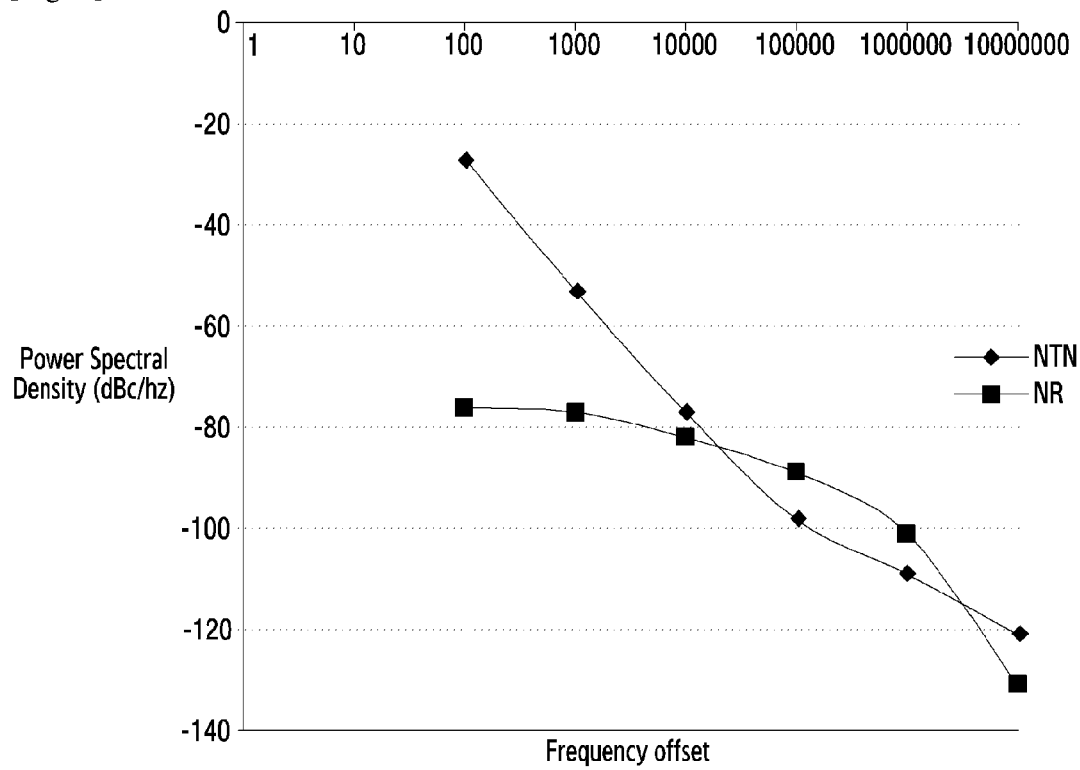
[Fig. 6]
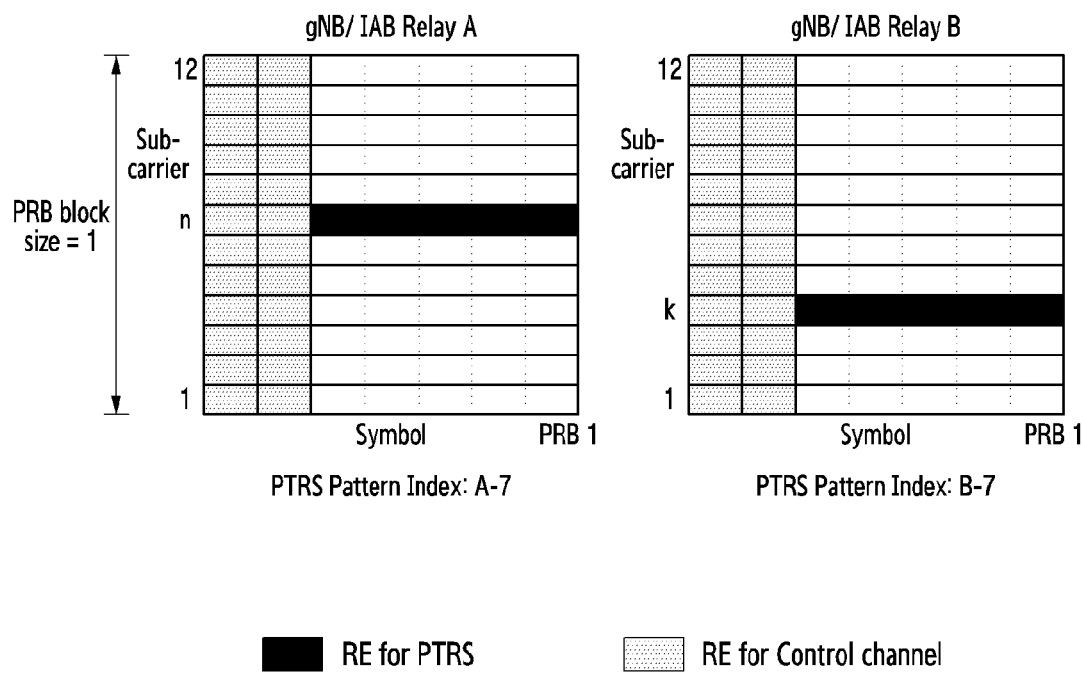

[Fig. 7]
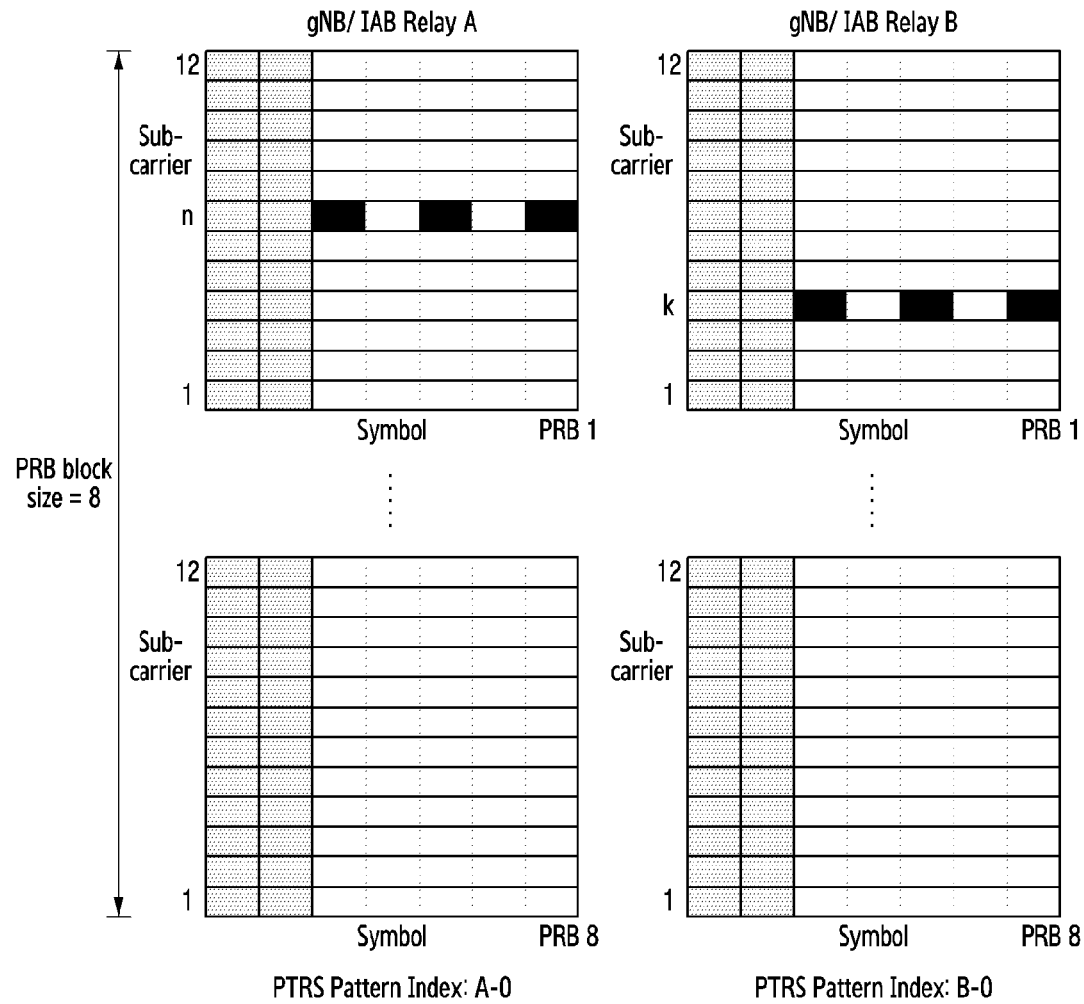
[Fig. 8]
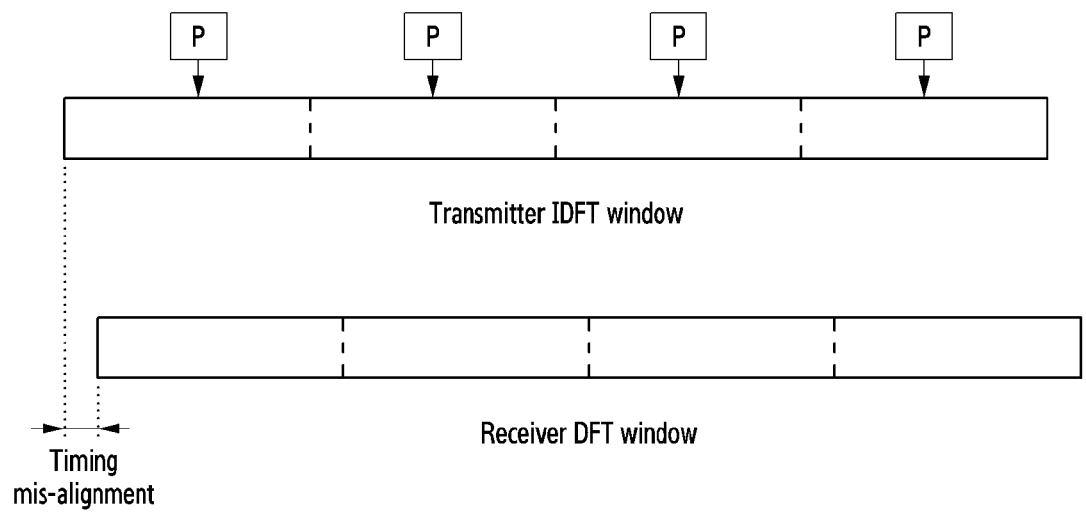

METHOD AND APPARATUS FOR IMPROVING IN AND RELATING TO INTEGRATED ACCESS AND BACKHAUL AND NON TERRESTRIAL NETWORKS

This application is the U.S. national phase of International Application No. PCT/KR2018/014937 filed Nov. 29, 2018 which designated the U.S. and claims priority to GB Patent Application No. 1720080.9 filed Dec. 1, 2017, the entire contents of each of which are hereby incorporated by reference.

TECHNICAL FIELD

The present disclosure relates to a telecommunication network employing Integrated Access and Backhaul (IAB) and/or Non Terrestrial Networks (NTN).

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An area of interest concerning IAB and NTN is the design of Physical layer solutions for increased spectral efficiencies. It is important to limit the amount of reference signal overhead in IAB to achieve increased spectral efficiency. One of the reference signals needed is Phase Tracking Reference Signal (PTRS), and the PTRS density can be pre-configured to suit the Modulation and Coding Scheme (MCS) level and the bandwidth allocation. In IAB, the allocated bandwidth for the backhaul component can be dynamic and, depending on the radio channel conditions, the MCS levels can also vary. This requires that a variable PTRS density is applied to the backhaul links.

One of the IAB configurations under consideration in standardization is the use of existing Base Stations (gNBs) as relay nodes (rTRP) for the extension of wireless backhaul links up to a node which has a fiber/wired backhaul connection.

With a higher density of New Radio (NR) gNBs (likely to be small cells), there will be multiple, yet fixed, relay backhaul links possible to be configured. Some of these backhaul links will be spatially near to each other and interference will occur. This will affect the PTRS patterns that can be deployed, as PTRS-PTRS interference has a negative impact on the whole of the radio sub-frames.

So there is a need for providing orthogonal (i.e. non-interfering) PTRS patterns between neighboring gNBs. There is also a need to signal such PTRS patterns amongst these gNBs with minimal overhead.

Another issue arises with the use of Non Terrestrial Network (NTN) technology.

NTN Phase Noise (PN) model is significantly different from NR PN model. Also, the coverage footprint for an NTN based cell (from e.g. a satellite, airship, balloon or drone) is likely to be very large, with a large path loss and signal delay. Therefore, it is clear that the PTRS regime must be different for NTN than for other solutions.

DISCLOSURE OF INVENTION

Solution to Problem

Embodiments of the present disclosure aim to address these and other issues and to increase the overall spectral efficiency of the IAB links.

Embodiments of the present disclosure aim to address particular issues with NTN.

Embodiments of the present disclosure has a feature whereby access spectrum, typically used to connect a base station to a mobile device or User Equipment (UE) is used additionally to provide backhaul functionality to connect a base station to a core network, via another base station. This is particularly useful for base stations where it otherwise be difficult to provide wired access to the core network. The available capacity can be dynamically adjusted to provide suitable resources, split between access and backhaul, as required.

According to the present disclosure there is provided an apparatus and method as set forth in the appended claims. Other features of the present disclosure will be apparent from the dependent claims, and the description which follows.

Although a few preferred embodiments of the present disclosure have been shown and described, it will be appreciated by those skilled in the art that various changes and modifications might be made without departing from the scope of the present disclosure, as defined in the appended claims.

BRIEF DESCRIPTION OF DRAWINGS

For a better understanding of the present disclosure, and to show how embodiments of the same may be carried into effect, reference will now be made, by way of example only, to the accompanying diagrammatic drawings in which:

FIG. 1 shows a typical network setup using IAB;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 shows a comparison of Phase Noise models for NTN with NR;

FIG. 6 shows a representation of PTRS configuration and indexing for neighbouring gNBs according to an embodiment of the present disclosure;

FIG. 7 shows a further representation of PTRS configuration and indexing for neighbouring gNBs according to an embodiment of the present disclosure; and FIG. 8 shows a representation of PTRS insertion in the presence of timing misalignment, according to an embodiment of the present disclosure.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for configuring PTRS transmissions in a telecommunication network employing Integrated Access and Backhaul (IAB) and/or Non Terrestrial Networks (NTN).

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a network setup using IAB according to various embodiments of the present disclosure. In FIG. 1, each of three base stations 10, 20, 30 is connected to one or more terminals 50. Base station 10 is provided with a fiber connection 40 to the core network. Base stations 20, 30 do not have such a wired connection and make use of the Access spectrum to provide backhaul connections to the wired base station 10, which then transmits/receives the required data to/from the core network.

The BS 10, 20, 30 is network infrastructure that provides wireless access to the terminals 50. The BS 10, 20, 30 has coverage defined as a predetermined geographical region based on the distance at which a signal can be transmitted. The BS 10, 20, 30 may be referred to as "access point (AP)," "eNodeB (eNB)," "5th generation (5G) node," "wireless point," "transmission/reception Point (TRP)" as well as "base station." Especially, The BS 20, 30 may be referred to as "relay node" or "relay transmission/reception Point (rTRP)."

Each of the terminals 50 is a device used by a user, and performs communication with the BS 10, 20, 30 through a wireless channel. Depending on the case, at least one of the terminals 50 may operate without user involvement. That is, at least one of the terminals 50 is a device that performs machine-type communication (MTC) and may not be carried by the user. Each of the terminals 50 may be referred to as "user equipment (UE)," "mobile station," "subscriber station," "remote terminal," "wireless terminal," or "user device" as well as "terminal."

The BS 10, 20, 300 and the terminal 50 may transmit and receive wireless signals in millimeter wave (mmWave) bands (for example, 28 GHz, 30 GHz, 38 GHz, and 60 GHz). At this time, in order to improve a channel gain, the BS 10, 20, 30 and the terminal 50 may perform beamforming. The beamforming may include transmission beamforming and reception beamforming. That is, the BS 10, 20, 30, and the terminal 50 may assign directivity to a transmission signal and a reception signal. To this end, the BS 10, 20, 30 and the terminals 50 may select serving beams through a beam search procedure or a beam management procedure. After that, communications may be performed using resources having a quasi co-located relationship with resources carrying the serving beams.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel to terminals 50 or from terminals 50. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams. The backhaul communication interface 220 may be a wireless communication interface.

The storage unit 230 stores a basic program, an application, and data such as setting information for the operation of the BS 10, 20, 30. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may include PTRS mapping function. Here, the PTRS mapping function may be a command/code temporarily resided in the controller 240, a storage space that stores the command/code, or a part of circuitry of the controller 240.

According to exemplary embodiments of the present disclosure, the controller 240 may determine offset of RE for mapping a PTRS and transmit related information to UEs. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may include an identifying function for identifying the location of the transmitted PTRS. Here, the identifying function may be a command/code temporarily resided in the controller 330, a storage space that stores the command/code, or a part of circuitry of the controller 330.

FIG. 4 illustrates the communication interface in the wireless communication system according to various embodiments of the present disclosure. FIG. 4 shows an example for the detailed configuration of the wireless communication interface 210 of FIG. 2 or the communication interface 310 of FIG. 3 or the backhaul communication interface 220 of FIG. 2 if the BS 20, 30 is a relay node, More specifically, FIG. 4 shows elements for performing beamforming as part of the communication interface 210, 220 of FIG. 2 or the communication interface 310 of FIG. 3.

Referring to FIG. 4, the communication interface 210, 220 or 310 includes an encoding and circuitry 402, a digital circuitry 404, a plurality of transmission paths 406-1 to 406-N, and an analog circuitry 408.

The encoding and modulation circuitry 402 performs channel encoding. For the channel encoding, at least one of a low-density parity check (LDPC) code, a convolution code, and a polar code may be used. The encoding and modulation circuitry 402 generates modulation symbols by performing constellation mapping.

The digital beamforming circuitry 404 performs beamforming for a digital signal (for example, modulation symbols). To this end, the digital beamforming circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

One of the IAB configurations under consideration in standardization is the use of existing Base Stations (gNBs) as relay nodes (rTRP) for the extension of wireless backhaul links up to a node which has a fiber/wired backhaul connection.

With a higher density of New Radio (NR) gNBs (likely to be small cells), there will be multiple, yet fixed, relay backhaul links possible to be configured. Some of these backhaul links will be spatially near to each other and interference will occur. This will affect the PTRS patterns that can be deployed, as PTRS-PTRS interference has a negative impact on the whole of the radio sub-frames. So, there is a need for providing orthogonal (i.e. non-interfering) PTRS patterns between neighboring gNBs. There is also a need to signal such PTRS patterns amongst these gNBs with minimal overhead.

FIG. 5 shows a comparison of Phase Noise models for NTN with NR.

As shown in FIG. 5, Non Terrestrial Networks (NTN) Phase Noise (PN) model is significantly different from NR PN model. Also, the coverage footprint for an NTN based cell (from e.g. a satellite, airship, balloon or drone) is likely to be very large, with a large path loss and signal delay. Therefore, it is clear that the PTRS regime must be different for NTN than for other solutions.

The features of NR PTRS design are as follows.
PTRS design is Phase Noise (PN) model dependent
The main objectives are for Common Phase Error (CPE) compensation, Carrier Frequency Offset (CFO)/Doppler estimation PTRS density and pattern depend on bandwidth and MCS
Density and pattern in time domain depend on MCS only
Density and pattern in frequency domain depend on BW only In connection with IAB, an embodiment of the present disclosure is concerned with the dynamic access/backhaul links that can be configured in an IAB setting as depicted in FIG. 1. This configuration is likely to be in NR mm-wave spectrum, and both links (i.e. Access and Backhaul) will require PTRS insertion to counter the phase noise effects. Also, interference can occur in Access-Access or Access-Backhaul or Backhaul-Backhaul components in the neighboring cells, depending on the dynamically allocated spectrum.

Embodiments of the present disclosure provide a mutually orthogonal PTRS design for each of the contributing gNBs, but also base it on a basic PTRS pattern, such that more dense patterns can be signalled to the neighbour gNBs with only index numbers or index term, thereby reducing signalling overhead.

Embodiments utilize orthogonal patterns for PTRS but also utilise more dense patterns from a predefined base pattern to reduce the signalling overhead.

The base pattern can suitably be the least dense PTRS pattern, i.e. with current RAN1 agreements on access PTRS-PTRS on every $8^{th}$ Resource Block (RB) and every $2^{nd}$ OFDM symbol. For the Backhaul component, higher MCS is likely to be used and even higher PTRS densities may be derived. For each of the neighbouring gNBs, a unique subcarrier off-set in the PRB can be pre-configured for PTRS insertion. In this way, the base patterns will be orthogonal for the neighbouring gNBs.

When more dense patterns are required, a pre-defined methodology can be enacted, such as doubling the frequency density in first step and then doubling the time density in the second step, then repeating these steps. All the time, such steps can be indexed and only this (commonly agreed) index needs to be signalled amongst the gNBs. This avoids the need to signal the explicit configuration, since the indexing is agreed in advance.

FIG. 6 shows a representation of PTRS configuration and indexing for neighbouring gNBs according to an embodiment of the present disclosure.

FIG. 7 shows a further representation of PTRS configuration and indexing for neighbouring gNBs according to an embodiment of the present disclosure.

Possible PTRS patterns and the indexing for the perceived highest PTRS density are shown in FIG. 6. A similar figure for the perceived lowest PTRS density is shown in FIG. 7. Here it is assumed there are 8 PTRS density patterns, with unique subcarrier off-sets for each neighbouring gNB.

Each of the patterns can be derived from the base pattern (highest or lowest density), where the PTRS density is increased or decreased by an agreed factor (for example 2). Due to this simpler indexing method, only a limited number of bits are needed to signal the pattern to the neighbouring gNBs. It should be noted that due to the dynamic allocation of access and backhaul components in the same spectrum, different kinds of PTRS density patterns may occur in each signal/interference combination. With this simple signalling, full knowledge of the PTRS pattern can be transmitted to the gNBs. Depending on the interference levels, the gNBs can decide to keep the affected REs empty or use for data transmissions.

In FIG. 6, there are shown a PTRS allocation for gNB A and gNB B. It can be seen that these neighbouring cells employ an offset such that the PTRS is transmitted on subcarrier n for gNB A and on subcarrier k for gNB B. By ensuring that different subcarriers are used, PTRS-PTRS interference can be avoided between neighbouring cells. PTRS is transmitted on all available symbols of the selected subcarrier, since this represents the highest density PTRS.

In FIG. 7, the perceived PTRS density is lowest and so the number of symbols required is lower. In this case, the PRB block size is 8. In the first of these blocks, PTRS is transmitted on 3 of the 4 possible symbols only and then not at all on the remaining 7 blocks. This is the same for both neighbouring cells A and B. However, note that the offset is maintained i.e. A transmits on subcarrier n and B transmits on subcarrier k.

In this way, it is possible to ensure orthogonality between neighbouring gNBs, by using offset subcarriers, whilst also reducing signalling overhead by use of an index system to minimise signalling. The saving in REs, which would otherwise be required for PTRS can then be used to carry data. It should be noted that the separate Access and Backhaul components of the neighbouring cells A and B may use any of the 2 patterns shown in FIGS. 6 and 7, or any intermediate pattern, yet the PTRS insertion will be orthogonal. Due to the simple indexing method, the neighbour cell (A or B) can be easily informed of the PTRS pattern used in the Access or Backhaul spectrum component.

In the NTN case referred to previously, NTN refers to the use of airborne or spaceborne vehicles may act as a relay and be connected to the ground node via wireless backhaul using mmWave. This situation is similar to IAB and a similar regime to the aforementioned may be considered in such a case. As such, the arrangement of PTRS in NTN may be considered as a particular example of IAB. It brings in some other considerations, but in essence, the same regime may be used, as set out above.

Further, the PN model of NTN is significantly different from the NR PN model. In NTN, the time and frequency density/pattern tables may be redesigned by taking the new PN model into consideration. Redesign of the tables can be achieved by changing the thresholds in these tables, as currently carried out by 3GPP for terrestrial links. Considering the high speed of airborne/spaceborne vehicles, the Doppler effect might be more significant in NTN than in terrestrial nodes. As such, the main objective of PTRS may no longer be CPE compensation but CFO/doppler estimation. Therefore, the speed of the airborne/spaceborne vehicle may also need to be considered when designing the time and frequency density/pattern tables.

The cell size in NTN is much larger than terrestrial network, since the cell is defined by the transmission footprint of the airborne/spaceborne vehicle, so an objective of some NTN use cases is to ensure coverage, so that the minimum size of resources required for scheduling may be as small as a single RB or sub-carrier. In such a case, there is a need to define a resource entity smaller than a RB for PTRS frequency density. For example, RB/n, so that it is possible to have n PTRS subcarriers in a single RB.

FIG. 8 shows a representation of PTRS insertion in the presence of timing misalignment, according to an embodiment of the present disclosure.

Furthermore, for Discrete Fourier transform spread orthogonal Frequency Division Multiplexing (DFT-s-OFDM) use for uplink, there is another issue. Because of the large cell size, the FFT window at the receiver may not be fully aligned with that at the transmitter. In such a case, the PTRS chunks should be placed in the middle of the symbol for pre-DFT PTRS insertion so as to avoid head or tail insertion. More particularly, if the PTRS configuration needs to contain N chunks of chunk size M, the transmitter IDFT window can be divided into N equal time intervals and within each time interval the middle M positions (counted from the central position of the time interval to either end) can be used to insert PTRS. If the chunks are placed in the head or tail of the symbol, when synchronization is not perfect, the chunk should be preadjusted at the transmitter to make sure all of the chunk stays in the receive IDFT window, avoiding performance degradation. This will avoid the PTRS information getting lost due to misalignments in the transmit and receive windows as shown in FIG. 8.

By ensuring the proper placement of the PTRS chunks, performance degradation can be minimized or avoided entirely.

Embodiments of the present disclosure may be performed by suitable programmed devices, such as base stations in a network or other entities within the network. In particular, base stations may be provided which implement a method according to an embodiment of the present disclosure.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a first relay node in a wireless communication system, the method comprising:
   receiving, from a second relay node via a backhaul link, coordination information including an index indicating a density pattern of a second phase tracking reference signal (PTRS);
   transmitting, to a terminal, configuration information including information on a first subcarrier offset for a first PTRS; and
   transmitting, to the terminal, the first PTRS based on the coordination information and the information on the first subcarrier offset,
   wherein the first subcarrier offset for the first PTRS is different from a second subcarrier offset for the second PTRS.

2. The method of claim 1, wherein the first PTRS is configured based on a pre-configured pattern which corresponds to either the most dense or the least dense PTRS pattern, and
   wherein the index indicates an amount of change of the density pattern of the second PTRS.

3. The method of claim 2, wherein the first PTRS pattern is for transmitting PTRS on every 2nd symbol.

4. The method of claim 2, wherein the first PTRS pattern is for transmitting PTRS on all available symbols.

5. The method of claim 2, wherein the amount of the change is a ratio of 2.

6. The method of claim 5, wherein the density pattern of the second PTRS indicates at least one of a time density or a frequency density.

7. The method of claim 6, the frequency density is changed based on the ratio of 2, after the time density is changed based on the ratio of 2.

8. The method of claim 1, wherein the first subcarrier offset indicates a location of the first PTRS in a physical resource block (PRB), and
   wherein the second subcarrier offset indicates a location of the second PTRS in a PRB.

9. The method of claim 1, wherein at least one chunk including the first PTRS is inserted into middle position of a symbol for transmitting the first PTRS.

10. The method of claim 1, the first relay node is operated in one of a non-terrestrial network (NTN) and an integrated access and backhaul (IAB) network.

11. A first relay node in a communication system, the base station comprising:
    communication interface; and
    a controller configured to:
    receive, from a second relay node via a backhaul link, coordination information including an index indicating a density pattern of a second phase tracking reference signal (PTRS);
    transmit, to a terminal, configuration information including information on a first subcarrier offset for a first PTRS; and transmit, to the terminal, the first PTRS based on the coordination information and the information on the first subcarrier offset, wherein the first subcarrier offset for the first PTRS is different from a second subcarrier offset for the second PTRS.

12. The first relay node of claim 11, wherein the first PTRS is configured based on a pre-configured pattern which corresponds to either the most dense or the least dense PTRS pattern, and wherein the index indicates an amount of change of the density pattern of the second PTRS.

13. The first relay node of claim 12, wherein the first PTRS pattern is for transmitting PTRS on every 2nd symbol.

14. The first relay node of claim 12, wherein the most dense PTRS pattern is for transmitting PTRS on all available symbols.

15. The first relay node of claim 12, the amount of the change is a ratio of 2.

16. The first relay node of claim 15, wherein the density pattern of the second PTRS indicates at least one of a time density or a frequency density.

17. The first relay node of claim 16, the frequency density is changed based on the ratio of 2, after the time density is changed based on the ratio of 2.

18. The first relay node of claim 11, wherein the first subcarrier offset indicates a location of the first PTRS in a physical resource block (PRB), and wherein the second subcarrier offset indicates a location of the second PTRS in a PRB.

19. The first relay node of claim 11, wherein at least one chunk including the first PTRS is inserted into middle position of a symbol for transmitting the first PTRS.

20. The first relay node of claim 11, the first relay nodes is operated in one of a non-terrestrial network (NTN) and an integrated access and backhaul (IAB) network.

\* \* \* \* \*